United States Patent [19]

Nakajima

[11] Patent Number: 5,817,411
[45] Date of Patent: Oct. 6, 1998

[54] FRICTION MATERIAL

[75] Inventor: Osamu Nakajima, Saitama, Japan

[73] Assignee: Akebono Brake Industry Co., Ltd., Tokyo, Japan

[21] Appl. No.: 814,234

[22] Filed: Mar. 11, 1997

[30] Foreign Application Priority Data

Mar. 15, 1996 [JP] Japan ................................ 8-059435

[51] Int. Cl.$^6$ .......................... B32B 27/38; B32B 27/42; B32B 27/08; C08J 5/14
[52] U.S. Cl. ...................... 428/334; 428/413; 428/425.3; 428/501; 428/502; 428/506; 428/524; 523/155; 523/156
[58] Field of Search .................................... 428/334, 413, 428/425.3, 501, 502, 506, 524, 525; 523/155, 156

[56] References Cited

U.S. PATENT DOCUMENTS

| | | | |
|---|---|---|---|
| 4,369,263 | 1/1983 | Matsushima et al. | 523/156 |
| 4,785,029 | 11/1988 | Honma et al. | 523/156 |
| 5,190,991 | 3/1993 | Parker et al. | 523/156 |
| 5,622,785 | 4/1997 | Gaylor et al. | 428/525 |

FOREIGN PATENT DOCUMENTS

| | | | |
|---|---|---|---|
| 4032182A1 | 5/1991 | Germany . | |
| 49233 | 2/1994 | Japan | 428/506 |
| 6-5393 | 3/1994 | Japan | 428/506 |
| 6-5395 | 3/1994 | Japan | 428/506 |
| 166760 | 6/1994 | Japan | 428/506 |
| 2155809 | 10/1985 | United Kingdom | 428/506 |

OTHER PUBLICATIONS

English Abstract of Japanese Publication No. JP 5279656 A 931026.
English Abstract of Japanese Publication No. 02292534, dated Dec. 4, 1990, *Patent Abstract of Japan*.
English translation of DE 4032182A1.

*Primary Examiner*—Peter A. Szekely
*Attorney, Agent, or Firm*—Finnegan, Henderson, Farabow, Garrett & Dunner, L.L.P.

[57] ABSTRACT

A friction material comprises: a thermosetting resin binder; an organic fiber; a non-asbestos inorganic fiber; a filler; and an organic resin coating formed on a scorched surface of the friction material.

3 Claims, No Drawings

FRICTION MATERIAL

BACKGROUND OF THE INVENTION

1. Field of the Invention

The present invention relates to a friction material for use in brakes, clutches and the like on various kinds of vehicles, industrial machines and so forth.

2. Description of the Prior Art

From environmental considerations, "non-asbestos friction materials" which do not use asbestos as the substrate have recently come to be used extensively in brake pads, brake linings, clutch facings, etc. in various kinds of vehicles, industrial machines and so forth (see, for example, U.S. Pat. No. 4,785,029). In the non-asbestos friction materials, heat resistant organic fibers, inorganic fibers other than asbestos, organic friction dusts, inorganic friction modifiers typically made of metals or metal oxides, solid lubricants and other fillers are bound to an integral mass by means of thermosetting resin binders. Metallic fibers may also be used as the fiber component (see, for example, U.S. Pat. No. 4,369,293) and friction materials that employ such metallic fibers are commonly referred to as "semi-metallics".

The friction coefficients of the non-asbestos friction materials are stable up to about 200° C. but at higher temperatures they are prone to decrease. This temporary loss in friction coefficient is referred to as "fade" and its principal cause may be explained as follows: upon braking, the surface temperature of the pad increases abruptly and the organic components such as organic friction dusts present on the surface layer of the friction material are gasified or turned to a tar-like material by thermal decomposition and the resulting gas or tar-like material deposited on the friction surface reduces the effective contact pressure and, hence, the friction coefficient. In addition, new friction materials have the organic components seep out on the surface and, hence, evolve such a great amount of gases in the initial period of use that the friction coefficient drops markedly, which is a phenomenon called "initial fade".

In order to deal with the "initial fade" problem, friction materials are usually subjected to scorching (see, for example, Japanese Patent Publication No. Hei. 6-94511). In scorching, the after-cured friction material is worked to specified dimensions and thereafter the organic components in the surface of the friction material are scorched with a burner, a hot plate or other suitable devices. The applied flame or heat removes the gas-evolving components from the surface layer of the friction material so that there will be substantially no gas evolution which would participate in the temporary drop of friction coefficient.

However, the friction material that has been scorched with a view to reducing the initial fade suffers a new problem in that the lubricating effect of the organic components is lost to thereby cause squeals (abnormal sound at high frequency) or vibrations (abnormal sound at low frequency) in the initial period of use.

SUMMARY OF THE INVENTION

The present invention has been accomplished under these circumstances and has as an object providing a friction material that is scorched and which yet is improved in squeal and vibration characteristics for the initial period of use.

According to the present invention, there is provided a friction material comprising: a thermosetting resin binder; an organic fiber; a non-asbestos inorganic fiber; a filler; and an organic resin coating formed on a scorched surface of said friction material.

In the friction material according to the present invention, a thickness of the organic resin coating may be 5 to 100 $\mu$m.

Further, the organic resin coating may include an inorganic lubricant.

Furthermore, a content of the inorganic lubricant in the organic resin coating may be 1 to 20 wt. %.

The friction material of the invention has an organic resin coating formed on a scorched surface and the lubricating effect of the organic resin coating reduces the squeal and vibration that occur in the initial period of use. If a specified amount of an inorganic lubricant is incorporated in the organic resin coating, the lubricating effect of the latter is further enhanced to reduce the initial squeal to even lower levels.

DETAILED DESCRIPTION OF THE PREFERRED EMBODIMENTS

The friction material of the invention will now be described in detail.

The friction material of the invention comprises a thermosetting resin binder, an organic fiber, a non-asbestos inorganic fiber and a filler.

The thermosetting resin binder is a component for binding the other ingredients of the friction material together and it is selected from phenolic resins (including straight phenolic resins, as well as rubber or otherwise modified phenolic resins), melamine resins, epoxy resins, cyanate ester resins and the like. Among these, phenolic resins are preferably used.

The thermosetting resin binder is typically used in an amount of 5 to 15 wt. % of the total quantity of the friction material.

The organic fiber is a heat-resistant organic fiber selected from aromatic polyamide fibers (aramid fibers commercially available as from E.I. Dupont under the trade name "KEVLAR") and flame-resistant acrylic fibers and so forth.

The non-asbestos inorganic fiber is selected from ceramic fibers (e.g. potassium titanate fibers and alumina fibers), glass fibers, carbon fibers, rock wools and so forth.

Fibrous materials may be employed in various ways; two or more kinds of organic fibers may be used, or two or more kinds of non-asbestos inorganic fibers may be used, or one kind of organic fiber may be used in combination with two or more kinds of non-asbestos inorganic fibers and vice versa. These fibrous materials are typically used in an amount of 10 to 40 wt. % of the total quantity of the friction material.

The filler may be exemplified by organic friction dusts composed of cashew resin, rubber or the like; an inorganic friction modifier; and a solid lubricant. The inorganic friction modifier may be selected from among the particles of metals such as copper, aluminum and zinc or the particles of metal oxides such as alumina, silica and zirconia. The solid lubricant may be selected from graphite, molybdenum disulfide and the like. Platy minerals such as vermiculite and mica may be added for the purpose of noise reduction; further, barium sulfate, calcium carbonate and the like may be added for the purpose of improving the mechanical properties such as compressive strength of the friction material.

These fillers are preferably used in amounts of 40 to 75% of the total quantity of the friction material. The barium sulfate, calcium carbonate and other additives that are incorporated with a view to improving mechanical properties preferably assume 30 to 65 wt. % of the total quantity of the friction material; the organic friction dusts preferably occupy 1 to 15 wt. % of the total quantity of the friction material; and the solid lubricant preferably assumes 5 to 15 wt. % of the total quantity of the friction material. As for the metal oxide particles, metal particles and platy minerals, at least one of these will suffice and may be incorporated in an amount of 1 to 10 wt. % of the total quantity of the friction material.

The friction material of the invention comprises the ingredients described above. A mixture including those ingredients in specified proportions in preliminarily shaped into tablets, which are charged into a hot press that is equipped with a pressure plate setup and which shapes the tablets thermally into an object having a specified thickness and density and which is subsequently after-cured.

These successive steps can be performed in the usual manner; the preliminary shaping may be performed at a contact pressure of 100 to 500 kgf/cm$^2$, and the thermal forming may be effected at a temperature of 130° to 180° C. at a contact pressure of 200 to 1,000 kgf/cm$^2$ for about 3 to 15 min, and the after-cure may be performed at a temperature of 150° to 300° C. for about 1 to 15 h.

In the next stage, the after-cured object is worked to specified dimensions and scorched in the usual manner by, for example, exposing the surface of the friction material to the flame from a burner for 30 to 300 sec or bringing the friction material into contact with a heated (400° to 700° C.) plate for 30 to 300 sec.

The scorched surface of the friction material is then provided with an organic resin coating to thereby yield the finished product.

The organic resin coating is preferably made of phenolic resins (which may be modified), polyvinyl alcohols, polyvinyl acetates, etc. The effectiveness of the organic resin coating in damping squeals and vibrations tends to increase with increasing thickness; however, if the coating is thicker than 100 μm, the friction coefficient drops so markedly that it may become lower than a practically acceptable level. On the other hand, the organic resin coating is not effective if it is thinner than 5 μm. Therefore, the thickness of the organic resin coating is preferably in the range of 5 to 100 μm.

The organic resin coating may be applied either by spraying or with a brush and spraying is preferred in controlling the thickness of the coating.

The purpose of the invention which is to reduce the squeal and vibration that occur in the initial period of use of friction materials can effectively be attained by merely providing the specified thickness of the organic resin coating; however, further reductions in the initial squeal and vibration can be realized by incorporating an inorganic lubricant into the organic resin coating.

The inorganic lubricant to be incorporated is preferably a solid lubricant such as graphite or molybdenum disulfide. The inorganic lubricant is typically incorporated in an amount of 1 to 20 wt. % of the total quantity of the organic resin coating. The lubricating effect of the inorganic lubricant contributes to the damping of squeal and vibration but the effectiveness of the inorganic lubricant is not fully developed if its content is less than 1 wt. %. On the other hand, if more than 20 wt. % of the inorganic lubricant is incorporated, the friction coefficient will drop so markedly that it becomes lower than a practically acceptable level.

In the friction material of the invention, the lubricating effect of the organic components in the surface which have been lost by scorching is compensated by the organic resin coating such as to reduce squeal and vibration in the initial period of use without sacrificing the initial fade characteristics. If the inorganic lubricant is added in the specified amount, it affords the additional lubricating effect which contributes to further reduction in the squeal and vibration that occur during the initial period of use.

The following embodiments and comparative examples are provided for the purpose of further illustrating the friction material of the invention but are in no way to be taken as limiting.

A phenolic resin (10 wt. %), an organic friction dust (10 wt. %), barium sulfate (58 wt. %), zirconium oxide (2 wt. %), graphite (5 wt. %), aramide fibers (10 wt. %) and potassium titanate fibers (5 wt. %) were mixed thoroughly under stirring to prepare a formulation, which was preliminarily shaped into tablets at a contact pressure of 200 kg/cm$^2$. The tablets were transferred into a hot press equipped with a pressure plate setup and thermally formed at a temperature of 155° C. for 10 min at a contact pressure of 500 kgf/cm$^2$. The formed object was subjected to after-cure at 200° C. for 10 h.

The after-cured object was worked into a specified shape and scorched by 120 sec exposure to the flame from a burner.

The scorched surface of the shaped part was provided with varying thicknesses (see Table 1 below) of an organic resin coating by spraying to prepare test specimens of friction material. The organic resin coating was either a phenol novolac resin containing 5 wt. % graphite (resin coating 1) or a polyvinyl alcohol resin per se (resin coating 2).

Each of the test specimens was mounted on a full-size brake dynamometer and subjected to evaluation tests. The test specimens all had the following dimensions:

Thickness of pressure plate: 5 mm
Thickness of test specimen: 10 mm
Area of friction surface: 45 cm$^2$ The full-size brake dynamometer was run at a speed of 20 km/h and the level of squeal generation and the vibration produced were measured. Squeal was measured in terms of its sound pressure level and the results were rated by the following criteria: level 1–2, ⊚; level 3, ○; level 4–5, x. To measure vibrations, the test specimens were mounted on a vehicle, which was driven at a speed of 40 km/h and the level of vibration that was produced at a deceleration of 0.4 G was subjected to a sensory evaluation. The results were rated by the following criteria: 1–2, ⊚; 3, ○; 4–5, x. In addition, the minimal friction coefficient at the first fade was measured in accordance with the JASO.

The results of measurements of the level of squeal generation, the vibration produced and the minimal friction coefficient at the first fade are collectively shown in Table 1.

TABLE 1

|  | Embodiment | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Resin Coating 1 | 5 | 50 | 100 |  |  |  | 150 |  | — |
| Resin Coating 2 |  |  |  | 5 | 50 | 100 |  | 150 | — |
| Squeal level | ○ | ⊙ | ⊙ | ○ | ○ | ⊙ | ⊙ | ⊙ | x |
| Vibration | ○ | ○ | ⊙ | ○ | ○ | ⊙ | ⊙ | ⊙ | x |
| μ | 0.26 | 0.25 | 0.24 | 0.25 | 0.24 | 0.23 | 0.20 | 0.19 | 0.27 |

1) Numerals for the resin coating refer to its thickness in μm.
2) Symbol "μ" signifies the minimal friction coefficient at the first fade in accordance with the JASO.

As is clear from Table 1, the test specimens of the invention (Embodiments 1 to 6) were satisfactory in terms of both the squeal level and the vibration. The data of Comparative Samples 1 and 2 show that when the organic resin coating was thicker than 100 μm, satisfactory results were obtained in terms of both the squeal level and the vibration but, on the other hand, the minimal friction coefficient at the first fade dropped markedly.

In order to verify the effective amount of the inorganic lubricant to be incorporated in the organic resin coating, additional test specimens were prepared by applying a phenol novolac resin containing different amounts of graphite as shown in Table 2 below. In accordance with the JASO, there was measured the friction coefficient equivalent to the second effectiveness of 100 km/h and a deceleration of 0.6 G. The results are shown in Table 2.

TABLE 2

| Graphite, wt % | 1 | 5 | 10 | 20 | 30 | 0 |
| --- | --- | --- | --- | --- | --- | --- |
| μ*) | 0.38 | 0.37 | 0.36 | 0.36 | 0.30 | 0.38 |

*)Friction coefficient equivalent to the second effectiveness of 100 km/h and deceleration of 0.6 G in accordance with the JASO.

The results shown in Table 2 verified that in order to secure the necessary friction coefficient, the preferred amount of the inorganic lubricant to be incorporated in the organic resin coating is less than 20 wt. %.

As described above, the friction material of the invention has the organic resin coating compensate for the lubricating effect of the organic components that have been lost by scorching and this is effective in suppressing the generation of squeal and vibration during the initial period of use without sacrificing the initial fade characteristics. If the inorganic lubricant is added in the specified amount, it affords the additional lubricating effect which develops a sufficient amount of lubricity to realize further reduction in squeal and vibration during the initial period of use.

What is claimed is:

1. A friction material comprising:

a thermosetting resin binder; an organic fiber; a non-asbestos inorganic fiber; a filler; and an organic resin coating having a thickness of 5 to 100 μm formed on a scorched surface of said friction material.

2. The friction material according to claim 1, wherein said organic resin coating includes an inorganic lubricant.

3. The friction material according to claim 2, wherein a content of said inorganic lubricant in said organic resin coating is 1 to 20 wt. %.

* * * * *